Nov. 20, 1951    W. F. BILLINGSLEY    2,575,439
TIRE
Filed May 13, 1949

Inventor
William F. Billingsley
By
Atty.

Patented Nov. 20, 1951

2,575,439

UNITED STATES PATENT OFFICE 2,575,439

TIRE

William F. Billingsley, Silver Lake, Ohio, assignor to The B. F. Goodrich Company, New York, N. Y., a corporation of New York Application May 13, 1949, Serial No. 93,068

5 Claims. (Cl. 152—209)

This invention relates to tires and is especially useful when applied to pneumatic tire carcasses although features of the invention are also useful with non-pneumatic tires.

With the increase in car speeds and reduction of engine noises it has been found that non-skid projections of the tread of a tire have produced disagreeable noise and the tendency in tire design has been in the direction of circumferentially ribbed tires which while reducing the noise have been inferior from the standpoint of skid resistance.

One type of tread design which has provided exceptional resistance to skidding has had separate cavities or voids formed in its tread surface entirely surrounded by rubber material contacting the road surface. Such a tread has however been found to be exceptionally noisy due to development of sub-atmospheric pressure in the cavities by compression of the tread thereabout in contacting the road surface resulting in partial evacuation of the cavities.

It is an object of the present invention to provide a tire tread with separated cavities or voids and at the same time to avoid disagreeable noise. A further object is to provide the cavities in circumferentially extending ribs of the tire tread, the construction being such that the ribs nevertheless have good columnar strength and stability.

Other objects are to provide ventilation and consequent cooler operation of the tire, to provide such vented cavities at any position across the tread face of the tire, and to provide cross venting to circumferential grooves of the tire tread.

These and other objects will appear from the following description and the accompanying drawings.

Figure 1:
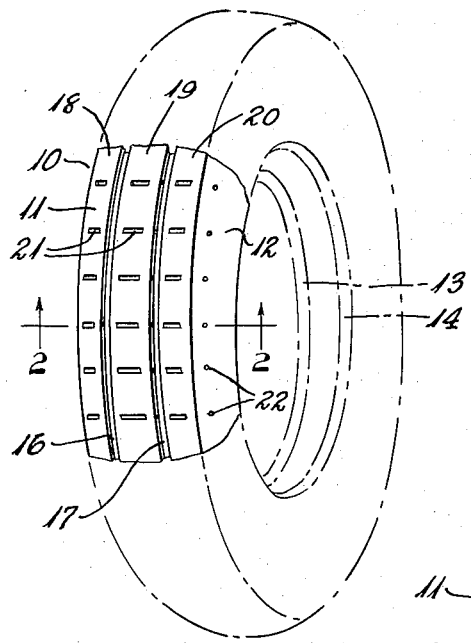
Fig. 1 is a perspective view of a tire casing constructed in accordance with and embodying the invention, parts being broken away and indicated by dot and dash lines.
Figure 2:
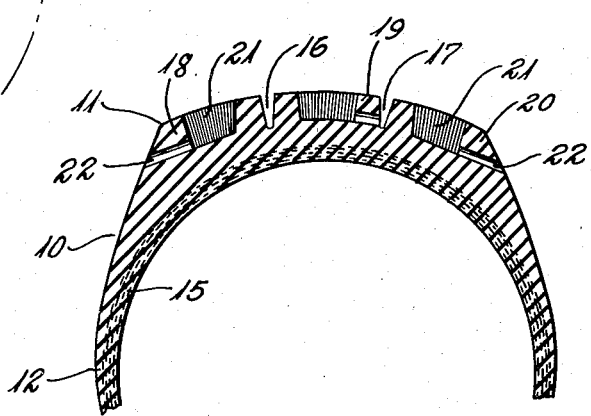
Fig. 2 is a cross-sectional view of the tread portion thereof, other parts being broken away.

Referring to the drawings, the numeral 10 designates a pneumatic tire casing having a tread 11, sidewalls 12 and rim-engaging bead portions 13, 14. The casing has the usual strain-resisting carcass 15 of cords or fabric extending from one bead portion to the other, to which the tread and sidewall portions of soft vulcanized rubber material are secured. The tread 11 of the tire casing is formed of raised projections separated by grooves and is shown in the illustrated embodiment as divided by circumferential grooves 16, 17 defining a plurality of circumferential ribs 18, 19, 20. While these ribs and grooves are illustrated as extending directly circumferentially of the tire both the ribs and the grooves may be continuous or discontinuous as desired, and may extend in devious paths about the tire if desired.

Each rib provides a broad road contacting surface in which isolated cavities or voids 21 are provided at intervals throughout their extent for providing greater resistance to skidding or slipping of the tire relative to the surface of the road bed, each cavity or void being completely surrounded by material of the tread for good strength and stability.

In order to prevent the forming of a partial vacuum in the voids or cavities and consequently to reduce noise due to contact of the tread material about the cavities with the surface of the pavement, each cavity or void is connected at its deepest portion to the nearest groove or to the sidewall of the tire by a vent opening 22, the vent openings being generally parallel to the tread surface and being remote therefrom. The vent openings may be small and still be of sufficient size to permit free flow of air to and from the voids or cavities. Their outlets are so arranged as to connect either to the sidewalls or to grooves extending a sufficient distance across or along the tire tread to communicate with the atmosphere beyond the area of contact of the tire with the road surface.

As the vent openings are arranged parallel to the tread surface at the deepest portion of the cavities, the openings are not closed under weight of the vehicle and consequent distortion of the tread, while, at the same time, the imperforate tread portion radially of the tire beyond the vents provides long wear of the tread before the vents are exposed at the face of the tread by wear.

The circumferential grooves of the tread are of such extent circumferentially of the tire as to provide communication between the vents and the atmosphere at all times, and the grooves are of sufficient width as not to close laterally of the tire under loading of the tire so that unobstructed communication of the vents to the atmosphere is accomplished at all times.

The venting openings not only reduce the tendency for forming of a vacuum in the voids or cavities and thereby reduce noise, but they also provide ventilation of the tread which reduces heating of the tire in use and provide greater cushioning of the tread.

Variations may be made without departing from the scope of the invention as it is defined by the following claims.

I claim:

1. A vehicle tire having sidewalls and a road-contacting tread therebetween of resilient material extending circumferentially of the tire and laterally thereof from sidewall to sidewall, said tread comprising relatively raised ribs extending circumferentially about the tire and separated from each other by grooves extending circumferentially about the tire, isolated cavities in the road-contacting surfaces of said ribs each surrounded at the tread surface of the tire by material of the ribs, and vent passages extending from said cavities through the material of said tread and connecting them with the atmosphere, the vent passages of the ribs at said sidewalls having openings in the sidewalls and the passages of the intermediate ribs having openings in said grooves.

2. A vehicle tire having sidewalls and a road-contacting tread therebetween of resilient material extending circumferentially of the tire and laterally thereof from sidewall to sidewall, said tread comprising relatively raised ribs extending circumferentially about the tire and separated from each other by grooves extending circumferentially about the tire, isolated cavities in the road-contacting surfaces of said ribs each surrounded at the tread surface of the tire by material of the ribs, vent passages extending from the deepest portions of said cavities through the material of said tread remote from the tread surface and connecting them with the atmosphere, the vent passages of the ribs at said sidewalls having openings in the sidewalls and the passages of the intermediate ribs having openings in said grooves.

3. A vehicle tire having sidewalls and a road-contacting tread therebetween of resilient material extending circumferentially of the tire and laterally thereof from sidewall to sidewall, said tread comprising relatively raised ribs extending circumferentially about the tire and separated from each other by grooves extending circumferentially about the tire, isolated cavities in the road-contacting surfaces of said ribs each surrounded at the tread surface of the tire by material of the ribs, and vent passages extending from said cavities through the material of said tread and connecting them with the atmosphere, the vent passages of the ribs at said sidewalls having openings in the sidewalls and the passages of the intermediate ribs having openings in said grooves, and said passages being substantially parallel to the tread surface of the tire.

4. A vehicle tire having sidewalls and a road-contacting tread therebetween of resilient material extending circumferentially of the tire and laterally thereof from sidewall to sidewall, said tread comprising a relatively raised rib extending circumferentially of the tire and separated from other portions of the tread by grooves extending circumferentially of the tire, isolated cavities in the road-contacting surface of said rib and each surrounded at the tread surface of the tire by material of said rib, and vent passages extending from said cavities through the material of said tread and connecting them with the atmosphere at said grooves.

5. A vehicle tire having sidewalls and a road-contacting tread therebetween of resilient material extending circumferentially of the tire and laterally thereof from sidewall to sidewall, said tread comprising relatively raised ribs extending circumferentially of the tire and separated from each other by grooves extending circumferentially of the tire, isolated cavities in the road-contacting surfaces of said ribs each surrounded at the tread surface of the tire by material of said ribs, and vent passages extending from said cavities through the material of said tread and connecting them with the atmosphere at said grooves.

WILLIAM F. BILLINGSLEY.

REFERENCES CITED

The following references are of record in the file of this patent:

UNITED STATES PATENTS

| Number | Name | Date |
| --- | --- | --- |
| 627,483 | Comly | June 27, 1899 |
| 864,112 | Smith | Aug. 20, 1907 |
| 1,450,818 | Ribak | Apr. 3, 1923 |
| 1,877,988 | Schrank | Sept. 20, 1932 |